US008566474B2

(12) United States Patent
Kanode et al.

(10) Patent No.: US 8,566,474 B2
(45) Date of Patent: Oct. 22, 2013

(54) METHODS, SYSTEMS, AND COMPUTER READABLE MEDIA FOR PROVIDING DYNAMIC ORIGINATION-BASED ROUTING KEY REGISTRATION IN A DIAMETER NETWORK

(75) Inventors: Mark Edward Kanode, Apex, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/161,443

(22) Filed: Jun. 15, 2011

(65) Prior Publication Data

US 2011/0314178 A1  Dec. 22, 2011

Related U.S. Application Data

(60) Provisional application No. 61/355,002, filed on Jun. 15, 2010.

(51) Int. Cl.
*G06F 15/16* (2006.01)
*G06F 15/173* (2006.01)
(52) U.S. Cl.
USPC ............ 709/238; 709/218; 709/224; 709/243
(58) Field of Classification Search
USPC .......................................................... 709/238
See application file for complete search history.

(56) References Cited

U.S. PATENT DOCUMENTS

| | | | |
|---|---|---|---|
| 6,954,784 B2 | 10/2005 | Aiken et al. | |
| 7,292,592 B2 * | 11/2007 | Rune | 370/401 |
| 7,401,217 B2 * | 7/2008 | Huang et al. | 713/153 |
| 7,457,875 B2 * | 11/2008 | Wada et al. | 709/225 |
| 7,471,634 B1 * | 12/2008 | Wenzel et al. | 370/241 |
| 7,551,926 B2 | 6/2009 | Rune | |
| 7,613,121 B2 * | 11/2009 | Chou et al. | 370/237 |
| 7,647,403 B2 * | 1/2010 | Gray | 709/225 |
| 7,660,320 B2 * | 2/2010 | Wepiwe et al. | 370/406 |
| 7,672,332 B1 * | 3/2010 | Chapman | 370/468 |
| 7,813,326 B1 * | 10/2010 | Kelm et al. | 370/338 |
| 7,840,699 B2 * | 11/2010 | Fujita et al. | 709/238 |

(Continued)

FOREIGN PATENT DOCUMENTS

| | | |
|---|---|---|
| WO | WO 2010/014856 A2 | 2/2010 |
| WO | WO 2012/119147 A1 | 9/2012 |

OTHER PUBLICATIONS

Notification of Transmittal of the International Search Report and the Written Opinion of the International Searching Authority, or the Declaration for International Patent Application No. PCT/US2011/040525 (Dec. 16, 2011).

(Continued)

*Primary Examiner* — Melvin H Pollack
(74) *Attorney, Agent, or Firm* — Jenkins, Wilson, Taylor & Hunt, P.A.

(57) ABSTRACT

Methods, systems, and computer readable media for providing dynamic origination-based routing key registration in a DIAMETER network are disclosed. According to one method, origin-based routing information is received, at a first DIAMETER node, from a second DIAMETER node. The origin-based routing information specifies one or more sources such that traffic originating from one of the one or more sources should be routed to the second DIAMETER node. A routing rule is automatically generated, at he first DIAMETER node, based on the received origin-based routing information.

25 Claims, 10 Drawing Sheets

(56) References Cited

U.S. PATENT DOCUMENTS

| | | | | |
|---|---|---|---|---|
| 7,855,982 | B2* | 12/2010 | Ramankutty et al. | 370/259 |
| 7,921,290 | B2* | 4/2011 | Albert et al. | 713/168 |
| 7,944,853 | B2* | 5/2011 | Eglin et al. | 370/254 |
| 7,957,355 | B1* | 6/2011 | Heiferling et al. | 370/338 |
| 8,059,533 | B2* | 11/2011 | Andreasen et al. | 370/230 |
| 8,060,612 | B1* | 11/2011 | Mangal et al. | 709/226 |
| 8,068,408 | B2* | 11/2011 | Ansari et al. | 370/216 |
| 8,089,958 | B2* | 1/2012 | Elliott et al. | 370/356 |
| 8,160,021 | B2* | 4/2012 | Ohba et al. | 370/331 |
| 8,165,143 | B2* | 4/2012 | Samajpati | 370/401 |
| 8,170,055 | B2* | 5/2012 | Fang et al. | 370/466 |
| 8,213,409 | B2* | 7/2012 | Rudnick et al. | 370/351 |
| 8,219,697 | B2* | 7/2012 | Langen et al. | 709/230 |
| 8,223,717 | B2* | 7/2012 | Dillon et al. | 370/331 |
| 2005/0005006 | A1 | 1/2005 | Chauffour et al. | |
| 2006/0002308 | A1 | 1/2006 | Na et al. | |
| 2006/0077926 | A1 | 4/2006 | Rune | |
| 2006/0172730 | A1 | 8/2006 | Matsuda | |
| 2006/0187829 | A1 | 8/2006 | Heiner et al. | |
| 2006/0206706 | A1 | 9/2006 | Dietz | |
| 2006/0221972 | A1 | 10/2006 | Bhargava et al. | |
| 2006/0274744 | A1 | 12/2006 | Nagai et al. | |
| 2007/0165613 | A1 | 7/2007 | Soo et al. | |
| 2007/0297419 | A1 | 12/2007 | Askerup et al. | |
| 2008/0039104 | A1 | 2/2008 | Gu et al. | |
| 2008/0147885 | A1 | 6/2008 | Bessis | |
| 2008/0151906 | A1* | 6/2008 | Kolli et al. | 370/395.31 |
| 2008/0178277 | A1* | 7/2008 | Oba et al. | 726/10 |
| 2009/0041043 | A1 | 2/2009 | Belling et al. | |
| 2009/0080440 | A1 | 3/2009 | Balyan et al. | |
| 2009/0083861 | A1 | 3/2009 | Jones | |
| 2009/0129271 | A1 | 5/2009 | Ramankutty et al. | |
| 2009/0185494 | A1* | 7/2009 | Li et al. | 370/241 |
| 2009/0232011 | A1 | 9/2009 | Li et al. | |
| 2009/0254674 | A1 | 10/2009 | Leiden et al. | |
| 2009/0265467 | A1* | 10/2009 | Peles | 709/226 |
| 2010/0030914 | A1 | 2/2010 | Sparks et al. | |
| 2010/0299451 | A1* | 11/2010 | Yigang et al. | 709/241 |
| 2011/0026460 | A1* | 2/2011 | Lafuente Alvarez et al. | 370/328 |
| 2011/0082940 | A1* | 4/2011 | Montemurro et al. | 709/227 |
| 2011/0116378 | A1 | 5/2011 | Ramankutty et al. | |
| 2011/0116382 | A1 | 5/2011 | McCann et al. | |
| 2011/0200053 | A1 | 8/2011 | Kanode et al. | |
| 2011/0202612 | A1 | 8/2011 | Craig et al. | |
| 2011/0202676 | A1 | 8/2011 | Craig et al. | |
| 2011/0225280 | A1 | 9/2011 | Delsesto et al. | |
| 2011/0225306 | A1 | 9/2011 | Delsesto et al. | |
| 2011/0238793 | A1* | 9/2011 | Bedare et al. | 709/220 |
| 2011/0302244 | A1 | 12/2011 | McCann et al. | |
| 2012/0005357 | A1* | 1/2012 | Hellgren | 709/229 |
| 2012/0005523 | A1* | 1/2012 | Korhonen et al. | 714/4.11 |
| 2012/0096177 | A1* | 4/2012 | Rasanen | 709/228 |
| 2012/0134361 | A1* | 5/2012 | Wong et al. | 370/392 |
| 2012/0155389 | A1 | 6/2012 | McNamee et al. | |
| 2012/0158995 | A1* | 6/2012 | McNamee et al. | 709/238 |
| 2012/0224524 | A1 | 9/2012 | Marsico | |

OTHER PUBLICATIONS

Final Official Action for U.S. Appl. No. 12/512,971 (Dec. 7, 2011).
Non-Final Official Action for U.S. Appl. No. 12/512,971 (Jun. 9, 2011).
Communication of European publication number and information on the application of Article 67(3) EPC for European Application No. 09803619.7 (Mar. 23, 2011).
Notification of Transmittal of the International Search Report and the Written Opinion of the International Searching Authority, or the Declaration for International Application No. PCT/US2009/052316 (Apr. 12, 2010).
Moran, "Determining When to Discard or Retry a SIP Request During Overload," SIPPING Working Group, Internet Draft, pp. 1-12 (Mar. 14, 2008).
Hilt, "SIP Overload Control: Report from the IETF Design Team," Bell-Labs/Alcatel-Lucent, pp. 1-14 (Mar. 2008).
"SRV Record," Wikipedia, http://en.wikipedia.org/wiki/SRV_record, pp. 1-3 (Feb. 25, 2008).
Hilt et al., "Essential Correction to the Session Initiation Protocol (SIP) 503 (Service Unavailable) Response," SIP Working Group, Internet Draft, pp. 1-11 (Jul. 6, 2007).
Rosenberg, "Requirements for Management of Overload in the Session Initiation Protocol," SIPPING, Internet-Draft, pp. 1-14 (Jun. 26, 2006).
Loughney., "Diameter Command Codes for Third Generation Partnership Project (3GPP) Release 5," Network Working Group, RFC 3589 (Sep. 2003).
Calhoun et al., "Diameter Base Protocol," Network Working Group, RFC 3588 (Sep. 2003).
Rosenberg et al., "Session Initiation Protocol (SIP): Locating SIP Servers," RFC 3263, pp. 1-18 (Jun. 2002).
Rosenberg et al., "SIP: Session Initiation Protocol," RFC 3261, pp. 1-270 (Jun. 2002).
Gulbrandsen et al., "A DNS RR for Specifying the Location of Services (DNS SRV)," Network Working Group, RFC 2782, pp. 1-12 (Feb. 2000).
Singh et al., "Failover, Load Sharing and Server Architecture in SIP Telephony," Department of Computer Science, Columbia University, pp. 1-18 (Publication Date Unknown).
Non-Final Official Action for U.S. Appl. No. 13/412,352 (Oct. 26, 2012).
Notification of Transmittal of the International Search Report and the Written Opinion of the International Searching Authority, or the Declaration for International Patent Application No. PCT/US2012/027736 (Jun. 12, 2012).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
Olson et al., "Support for IPv6 in Session Description Protocol (SDP)," RFC 3266, pp. 1-5 (Jun. 2002).

* cited by examiner

```
<CEA> ::= < Diameter Header: 257 >
{ Result-Code }
{ Origin-Host }
{ Origin-Realm }
1* { Host-IP-Address }
{ Vendor-Id }
{ Product-Name }
[ Origin-State-Id ]
[ Error-Message ]
* [ Failed-AVP ]
* [ Supported-Vendor-Id ]
* [ Auth-Application-Id ]
* [ Inband-Security-Id ]
* [ Acct-Application-Id ]
* [ Vendor-Specific-Application-Id ]
[ Firmware-Revision ]
* [ AVP ]
[Origin-Based Routing Key]
```
— 318

FIG. 4

```
<CER> ::= < Diameter Header: 257, REQ >
{ Origin-Host }
{ Origin-Realm }
1* { Host-IP-Address }
{ Vendor-Id }
{ Product-Name }
[ Origin-State-Id ]
* [ Supported-Vendor-Id ]
* [ Auth-Application-Id ]
* [ Inband-Security-Id ]
* [ Acct-Application-Id ]
* [ Vendor-Specific-Application-Id ]
[ Firmware-Revision ]
[ AVP ]
[Origin-Based Routing Key]
```

FIG. 6

Peer Routing Table (PRT)

| Dest-Realm | Appl ID | Dest-Host | Orig-Realm | Orig-Host | Action | Route List Name | Pri |
|---|---|---|---|---|---|---|---|
| Don't care | AppX | Don't care | RealmY.net | Don't care | Route to Peer | TKLC_NW | 1 |
| Don't care | AppX | Don't care | RealmZ.net | Don't care | Route to Peer | TKLC_NW | 1 |
| myNW.com | 43 | Don't care | Don't care | 21 | Route to Peer | HSS1 | 1 |
| myNW.com | 65 | Don't care | Don't care | Don't care | Route to Peer | MME2 | 1 |
| Don't care | Don't care | Don't care | Orange.com | Don't care | Send Answer "X" | --- | 99 |

FIG. 9

METHODS, SYSTEMS, AND COMPUTER READABLE MEDIA FOR PROVIDING DYNAMIC ORIGINATION-BASED ROUTING KEY REGISTRATION IN A DIAMETER NETWORK

PRIORITY CLAIM

This application claims the benefit of U.S. Provisional Patent Application No. 61/355,002, filed on Jun. 15, 2010, the disclosure of which is incorporated herein by reference in its entirety.

TECHNICAL FIELD

The subject matter described herein relates to routing network traffic in a DIAMETER network. More specifically, the subject matter relates to methods, systems, and computer readable media for providing dynamic origination-based routing key registration in a diameter network.

BACKGROUND

In conventional DIAMETER networks, there is currently no way for a DIAMETER node, such as a DIAMETER relay node or DIAMETER routing node, to automatically receive information from a peer DIAMETER node indicating which originating hosts or originating realms the peer DIAMETER node should receive particular types of traffic from. Expressed another way, there is currently no mechanism in the DIAMETER specifications that allows a peer DIAMETER node to specify, to a DIAMETER relay or routing node, that when the DIAMETER relay or routing node receives traffic from a particular originating host or originating realm, the traffic should be directed to the peer DIAMETER node. Internet engineering task force (IETF) request for comments (RFCs) 3588 and 3589 are incorporated herein by reference in their entireties. For example, in the event that network operator X signs an agreement with operator Y that all traffic transmitted through hub provider A's network should be routed to operator X's realm, it may be desirable for operator X to automatically notify hub provider A of the agreement between operator X and operator Y so that hub provider A can update its routing tables accordingly.

Currently, in the exemplary scenario described above, hub provider A must manually gather origin-based routing information and update its routing tables. For example, a human user may be required to manually log into a terminal associated with one or more DIAMETER nodes in the hub provider's network and add origin-based rules to the routing tables.

While no method currently exists for automatically notifying and updating the routing tables of a DIAMETER node with origin-based routing information, conventional solutions exist for automatic notification and routing table updating for destination-based routing information. Currently, this is accomplished using the domain name system (DNS). For example, if network operator X wishes to know the networks (i.e., realms or hosts) to which he can route traffic, operator X sends a DNS query to a DNS server that maintains this information. Based on the information included in the DNS response, network operator X (i.e., the DIAMETER node in realm X that initiated the DNS query) may automatically update its routing tables with the destination-based routing information.

As may be appreciated from the above discussion, one drawback to conventional methods for populating or updating routing information in DIAMETER nodes is that automatic routing table population is only available for destination-based routing information. As a result, a corollary drawback of conventional methods is therefore that populating and/or updating routing information for DIAMETER nodes is a manual process that may be slow and prone to error.

Accordingly, in light of these difficulties, a need exists for improved methods, systems, and computer readable media for automatically populating and/or updating routing tables of DIAMETER nodes with origin-based routing information.

SUMMARY

Methods, systems, and computer readable media for providing dynamic origination-based routing key registration in a DIAMETER network are disclosed. According to one method, origin-based routing information is received, at a first DIAMETER node, from a second DIAMETER node. The origin-based routing information specifies one or more sources such that traffic originating from one of the one or more sources should be routed to the second DIAMETER node. A routing rule is automatically generated, at the first DIAMETER node, based on the received origin-based routing information.

A DIAMETER node for providing dynamic origination-based routing key registration in a DIAMETER network is also disclosed. The DIAMETER node includes a communications module for receiving, from a second DIAMETER node, origin-based routing information, where the origin-based routing information specifies one or more sources such that traffic originating from one of the one or more sources should be routed to the second DIAMETER node. The DIAMETER node also includes a rule generation module for automatically generating a routing rule based on the received origin-based routing information.

The subject matter described herein for providing dynamic origination-based routing key registration in a DIAMETER network may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIG. 4 is a diagram illustrating contents of an exemplary modified DIAMETER CER message for providing dynamic origination-based routing key registration according to an embodiment of the subject matter described herein;

FIG. 6 is a diagram illustrating contents of an exemplary modified DIAMETER CER message for providing dynamic origination-based routing key registration according to an embodiment of the subject matter described herein;

FIG. 9 is an exemplary peer routing table illustrating exemplary routing rules that may be generated based on origination-based routing rules for providing dynamic origination based routing key registration according to an embodiment of the subject matter described herein.

DETAILED DESCRIPTION

Methods, systems, and computer readable media for providing dynamic origination-based routing key registration in a DIAMETER network are disclosed. In contrast to conventional, destination-based routing key registration in DIAMETER networks, registering which origin-hosts and/or origin-realms should direct traffic toward a DIAMETER node allows for automatic generation of routing rules and population of routing tables in DIAMETER nodes specifying one or more sources such that traffic originating from one of the one or more sources should be routed to a DIAMETER node submitted a notification message. In one embodiment, the notification message may include a new peer-to-peer message or, alternatively, the notification message may include an enhanced (i.e., modified) version of a DIAMETER capabilities exchange message. It will be understood by one of ordinary skill in the art that implementation of the subject matter described herein may require modification to the software programming of one or more DIAMETER nodes. For example, a first DIAMETER node (i.e., sender) may be modified to generate the notification message including the origin-based routing information and a second DIAMETER node (i.e., receiver) may be modified to recognize and interpret the origin-based routing information included in the notification message (e.g., automatically generate origin-based routing rules and apply the routing rules for routing traffic). As a result, one advantage of the subject matter described herein is that populating and/or updating routing information for DIAMETER nodes to include origin-based routing information is an automatic process that may be faster and less prone to error than conventional, manual methods. Another advantage of the subject matter described herein is that a peer DIAMETER node may specify, to a DIAMETER relay or routing node, that when the DIAMETER relay or routing node receives traffic from a particular originating host or originating realm, the traffic should be directed to the peer DIAMETER node. Aspects of the subject matter described herein will be described in greater detail below with respect to FIGS. 1-9.

Figure 1:
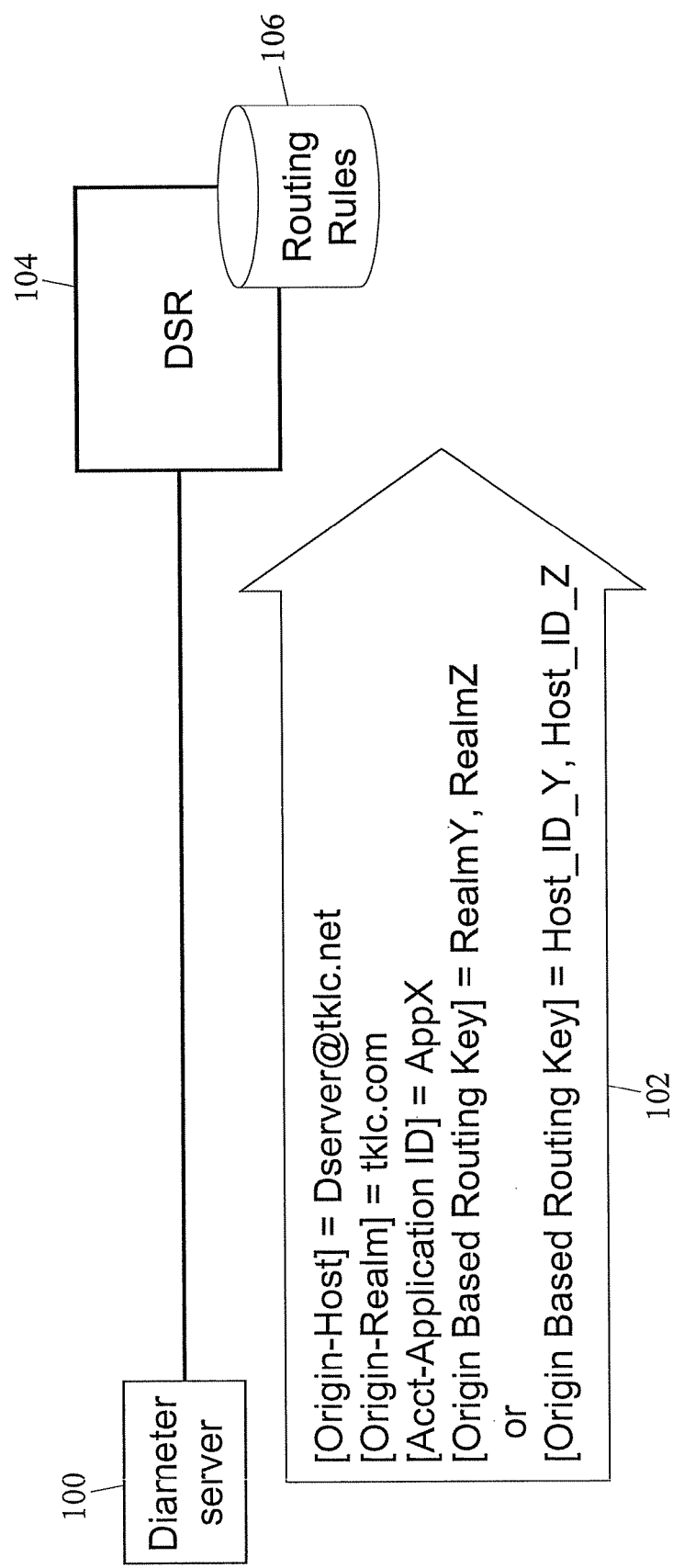
FIG. 1 is a network diagram illustrating an exemplary communications in a DIAMETER network for providing dynamic origination-based routing key registration according to an embodiment of the subject matter described herein.

FIG. 1 is a network diagram illustrating exemplary communications in a DIAMETER network for providing dynamic origination-based routing key registration according to an embodiment of the subject matter described herein. Referring to FIG. 1, DIAMETER server 100 may include a DIAMETER agent, DIAMETER relay, DIAMETER proxy, or other DIAMETER node capable of processing and routing DIAMETER messages. The DIAMETER protocol is designed as a peer-to-peer architecture, and every host that implements the DIAMETER protocol can act as either a client or a server depending on network deployment. As used herein, the term DIAMETER node may refer to a DIAMETER client, a DIAMETER server, or a DIAMETER agent. Three types of DIAMETER agents include a relay agent, a proxy agent, and a redirect agent. A DIAMETER relay agent may be used to forward a message to the appropriate destination, depending on the information contained in the message. A DIAMETER relay agent may aggregate requests from different realms (or regions) to a specific realm. Like a DIAMETER relay agent, a DIAMETER proxy agent may also be used to forward messages, but unlike a DIAMETER relay agent, a DIAMETER proxy agent can modify the message content and, therefore, provide value-added services, enforce rules on different messages, or perform administrative tasks for a specific realm. A DIAMETER redirect agent may act as a centralized configuration repository for other DIAMETER nodes. When a DIAMETER redirect agent receives a message, it may check its routing table and return a response message along with redirection information to its original sender.

In the scenario shown in FIG. 1, DIAMETER server 100 may wish for traffic that meets certain criteria to be routed to DIAMETER server 100. DIAMETER server 100 may inform neighboring DIAMETER signaling routers (DSR) of the origin-based routing information via one (or more) messages. For example, DIAMETER server 100 may send message 102 to DSR 104, which includes origin-based routing information that specifies one or more sources, such that traffic originating from one of the one or more sources should be routed to a second DIAMETER node. It is appreciated that message 102 may include a new message type for providing origin-based routing information or may leverage existing message formats without departing from the scope of the subject matter described herein.

Message 102 may identify DIAMETER server 100 by an origin host identifier and an origin realm identifier. For example, message 102 may include Origin-Host=Dserver@tklc.net and Origin-Realm=tklc.com. Additionally, message 102 may include information identifying an application identifier specifying an application type such that traffic originating from an application of the specified application type should be routed to DIAMETER server 100. Here, message 102 may specify Acct-Application ID=AppX. Finally, message 102 may include an origin-based routing key for indicating, to DSR 104, the identities of the realms or hosts from which traffic originating at those hosts or realms should be routed to DIAMETER server 100. In FIG. 1, message 102 may include origin-based routing key=realmY, realmZ (realms Y and Z not shown) and/or origin-based routing key=host_ID_Y, HOST_ID_Z (hosts Y and Z not shown).

In response to receiving message 102, DSR 104 may automatically generate one or more routing rules based on the origin-based routing information received in message 102. DSR 104 may then populate or update routing rules 106 with the newly generated rule(s) and route traffic using routing rules 106.

Figure 2:
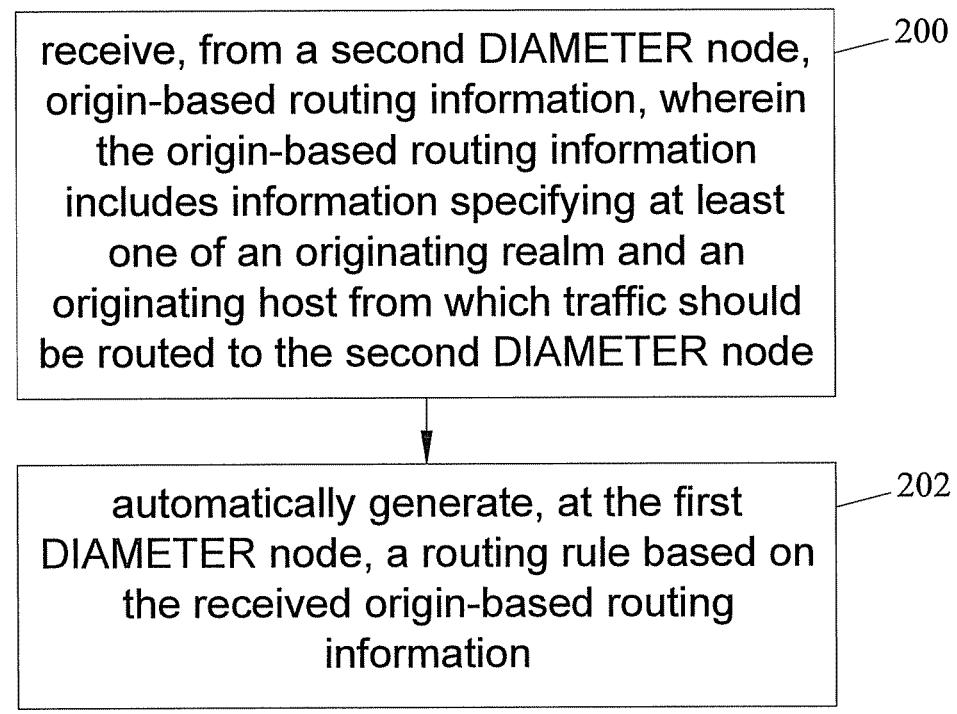
FIG. 2 is a flow chart illustrating an exemplary process for providing dynamic origination-based routing key registration according to an embodiment of the subject matter described herein.

FIG. 2 is a flow chart illustrating an exemplary process for providing dynamic origination-based routing key registration according to an embodiment of the subject matter described herein. The steps may be performed at a DIAMETER node, such as DSR 104 of FIG. 1. Referring to FIG. 2, in step 200, origin-based routing information is received from a second DIAMETER node, where the origin-based routing information includes information specifying one or more sources such that traffic originating from one of the one or more sources should be routed to the second DIAMETER node. For example, returning to FIG. 1, an origin-based routing key (i.e., realm Y, realmZ, hostY, or hostZ) may be included in message 102 received by DSR 104 sent from DIAMETER server 100.

In step 202, the first DIAMETER node may automatically generate a routing rule based on the received origin-based routing information.

Figure 3:
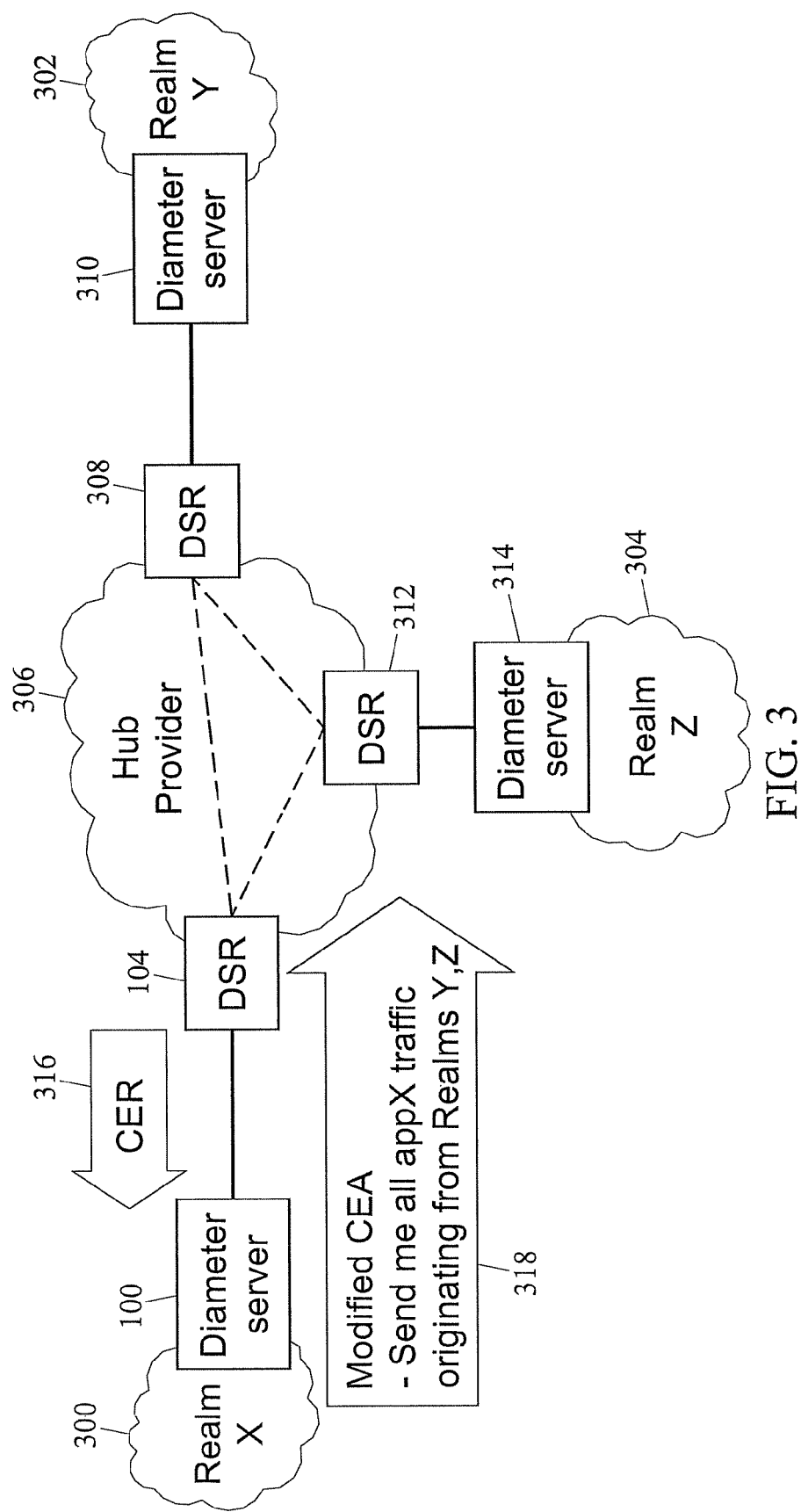
FIG. 3 is a network diagram illustrating using a modified DIAMETER CEA message in an exemplary DIAMETER network for providing dynamic origination-based routing key registration according to an embodiment of the subject matter described herein.

FIG. 3 is a network diagram illustrating using a modified DIAMETER CEA message in an exemplary DIAMETER network for providing dynamic origination-based routing key registration according to an embodiment of the subject matter described herein. Referring to FIG. 3, realm X 300 may be connected to realm Y 302 and realm Z 304 via hub provider network 306. Specifically, DSR 308 located at the edge of hub provider network 306 may be connected to DIAMETER server 310 in realm Y 302. Similarly, DSR 312 located at the edge of hub provider network 306 may be connected to DIAMETER server 314 in realm Z 304. DSRs 104, 308, and 312 may communicate with each other via signaling DIAMETER links (shown as dashed lines).

In FIG. 3, realm X 300 wishes for all traffic for application ID X originating from realm Y 302 and realm Z 304 to be routed to realm X 300. In contrast to prior destination-based systems where realm Y 302 could specify the realms it wished to route traffic to, the subject matter described herein allows for the reverse scenario, namely for a destination to specify those realms, hosts, or applications from which traffic originating from those realms, hosts, or application should be routed.

When two DIAMETER peers establish a transport connection, such as an SCTP association, they exchange a capabilities exchange message. This message allows the discovery of a peer's identity and its capabilities (e.g., protocol version number, supported Diameter applications, security mechanisms, etc.) At the time the connection is established, one entity may be designated as the initiator and the other may be designated as the responder. According to the DIAMETER specifications, the initiator may send a capabilities exchange request (CER) message and the responder will reply with a capabilities exchange answer (CEA) message. FIG. 3 shows a scenario in which DSR 104 has been designated as the initiator and therefore, may send CER message 316 when the SCTP association is set up. However, as shown in FIG. 3, rather than responding with a conventional CER message, DIAMETER server 100 may be configured to generate and send a modified CER message that includes an origin-based routing key and origin-based routing information. For example, DIAMETER server 100 may send modified CEA message 318 indicating "send me all appX traffic originating from realms Y and Z" to DSR 104. By leveraging an existing message format, minimal modifications may be required to the configurations of DIAMETER server 100 (to generate modified CER message 316) and of DSR 104 (to recognize the presence of origin-based routing information in the modified CER message 316).

FIG. 4 is a diagram illustrating contents of an exemplary modified DIAMETER CER message for providing dynamic origination-based routing key registration according to an embodiment of the subject matter described herein. As mentioned above, a conventional CEA message, indicated by the Command-Code set to 257 and the Command Flags "R" bit cleared, may be sent in response to a CER message. Referring to FIG. 4, the vendor-ID attribute value pair (AVP) (AVP Code 266) is an unsigned 32-bit integer (of type Unsigned32) and contains the Internet assigned numbers authority (IANA) "SMI Network Management Private Enterprise Codes" value assigned to the vendor of the DIAMETER application. In combination with the supported-vendor-ID AVP, the vendor-ID may be used to determine which vendor specific attributes may be sent to the peer. The Firmware-Revision AVP (AVP Code 267) is also of type Unsigned32 and may be used to inform a DIAMETER peer of the firmware revision of the issuing device. For devices that do not have a firmware revision (e.g., general purpose computers running DIAMETER software modules, for instance), the revision of the DIAMETER software module may be reported instead. The Host-IP-Address AVP (AVP Code 257) is of type Address and may be used to inform a DIAMETER peer of the sender's IP address. The Supported-Vendor-ID AVP (AVP Code 265) is of type Unsigned32 and may contain the IANA "SMI Network Management Private Enterprise Codes" value assigned to a vendor other than the device vendor. The Supported-Vendor-ID may be used in CER and CEA messages to inform a DIAMETER peer that the sender supports (a subset of) the vendor-specific AVPs defined by the vendor identified in the Supported-Vendor-ID AVP. The Product-Name AVP (AVP Code 269) is of type UTF8String, and may contain the name of the product assigned by the vendor.

In addition to the above-mentioned contents of a conventional DIAMETER CEA message, modified DIAMETER CEA message 318 may also include an origin-based routing key and origin-based routing information. For example, referring to FIG. 4, modified CEA message 318 may include a newly defined parameter including the tuple <host X, realm X, application> for indicating what traffic DSR X wants to receive and from whom. The routing key may describe a set of parameters and their values, which may than be used to identify what signaling traffic is to be sent to a specific destination. In other words, the routing key may be a set of parameters used to filter incoming DIAMETER messages for routing purposes. It is appreciated that the origin-based routing key may be made up of several different combinations, which may be implementation-specific.

Figure 5:
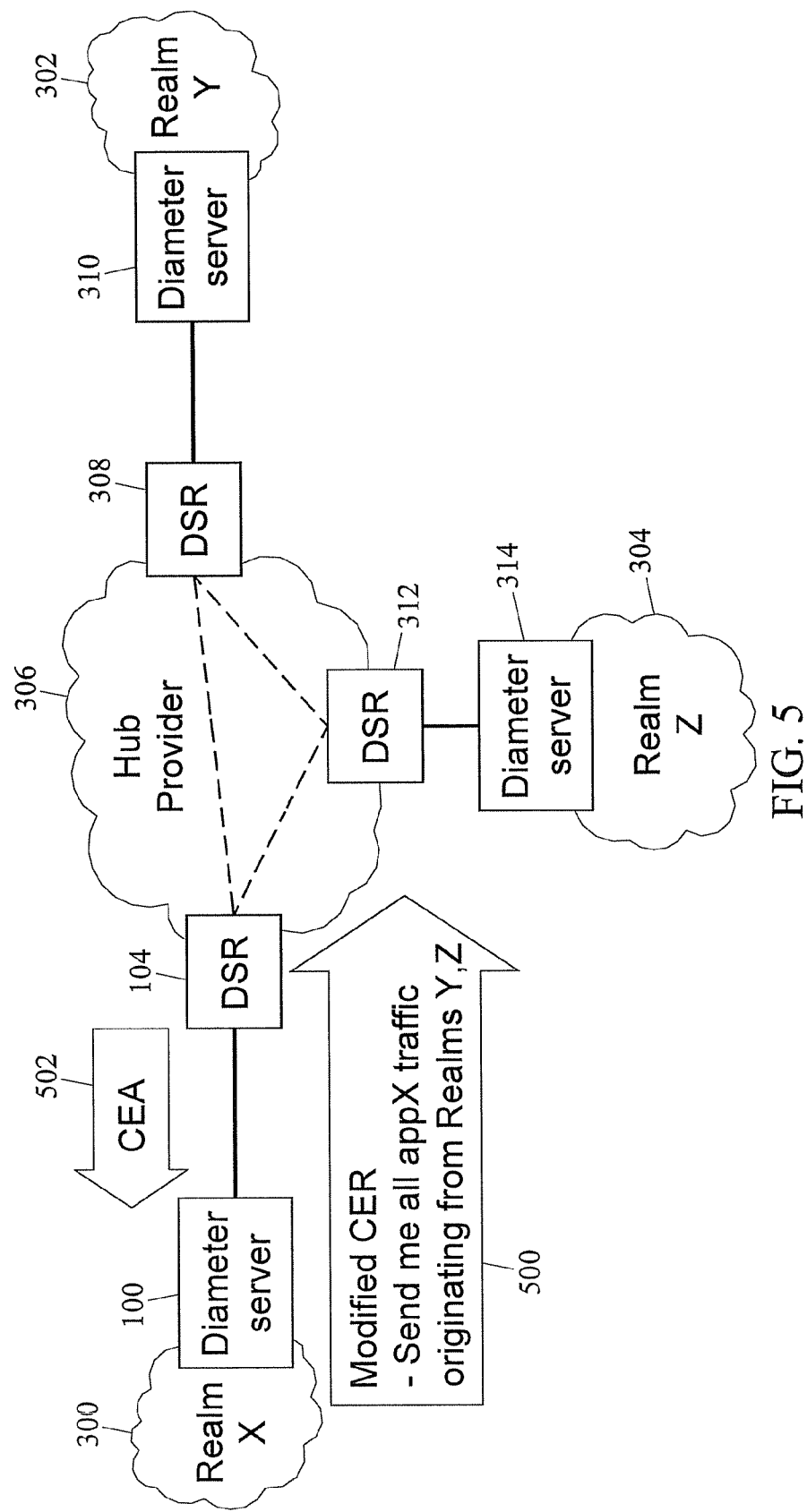
FIG. 5 is a network diagram illustrating using a modified DIAMETER CEA message in an exemplary DIAMETER network for providing dynamic origination-based routing key registration according to an embodiment of the subject matter described herein.

FIG. 5 is a network diagram illustrating using a modified DIAMETER CEA message in an exemplary DIAMETER network for providing dynamic origination-based routing key registration according to an embodiment of the subject matter described herein. Referring to FIG. 5, realm X 300 may be connected to realm Y 302 and realm Z 304 via hub provider network 306. Specifically, DSR 308 in hub provider network 306 may be connected to DIAMETER server 310 in realm Y 302. Similarly, DSR 312 in hub provider network 306 may be connected to DIAMETER server 314 in realm Z 304. DSRs 104, 308, and 312 may communicate with each other via signaling DIAMETER links (shown as dashed lines).

In FIG. 5, realm X 300 wishes for all traffic for application ID X originating from realm Y 302 and realm Z 304 to be routed to realm X 300. In contrast to prior destination-based systems where realm Y 302 could specify the realms it wished to route traffic to, the subject matter described herein allows for the reverse scenario, namely for a destination to specify those realms, hosts, or applications from which traffic originating from those realms, hosts, or application should be routed.

In contrast to the embodiment shown in FIG. 3, FIG. 5 shows a scenario in which DIAMETER server 100 has been designated as the initiator and DSR 104 has been designated as the responder. Therefore, DIAMETER server 100 may send a CER message to DSR 104. However, rather than sending a conventional CER message, DIAMETER server 100 may send a modified CER message 500 when a SCTP association is set up. DSR 104 may be configured to generate and return a conventional CER message. For example, DIAMETER server 100 may send modified CEA message 502 indicating "send me all appX traffic originating from realms Y and Z" to DSR 104. Again, by leveraging an existing message format, minimal modifications may be required to the configurations of DIAMETER server 100 (to generate modified CER message 500) and of DSR 104 (to recognize the presence of origin-based routing information in the modified CER message 500). Details of modified CER message 500 will now be described in greater detail below with respect to FIG. 6.

FIG. 6 is a diagram illustrating contents of an exemplary modified DIAMETER CER message for providing dynamic origination-based routing key registration according to an embodiment of the subject matter described herein. Like the contents of CEA message 102 described above and shown in FIG. 4, CER message 500 may include a vendor-ID AVP (AVP Code 266), a vendor-ID, a Firmware-Revision AVP (AVP Code 267), a Host-IP-Address AVP (AVP Code 257), a Supported-Vendor-ID AVP (AVP Code 265) and a Product-Name AVP (AVP Code 269) is of type UTF8String, and may contain the name of the product assigned by the vendor.

Also like CEA message 310, in addition to the conventional contents of a DIAMETER CER message, modified DIAMETER CER message 500 may include an origin-based routing key and origin-based routing information. For example, referring to FIG. 6, modified CER message 500 may include a newly defined parameter including a tuple indicating what traffic DSR X wants to receive and from whom.

Figure 7:
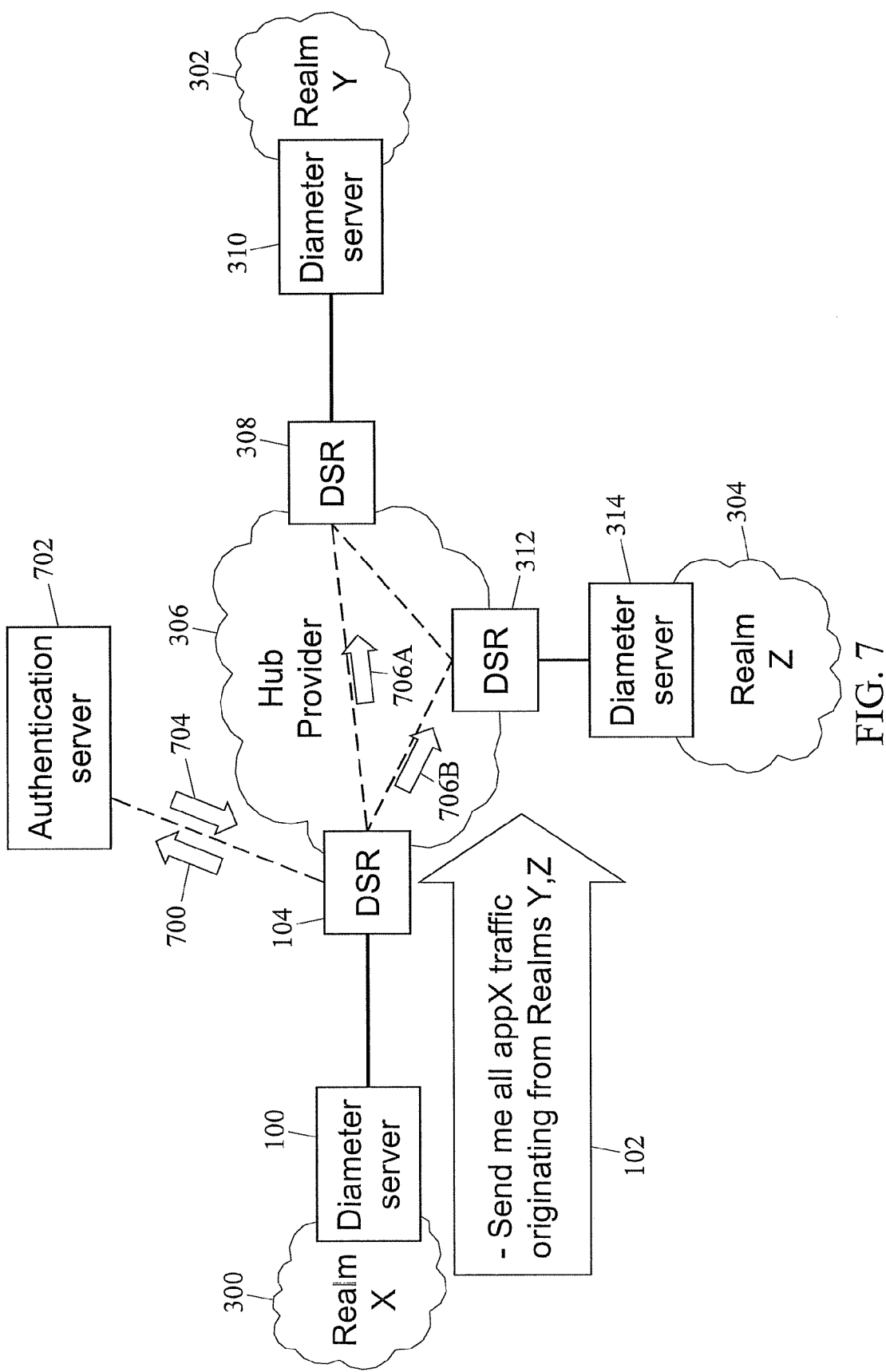
FIG. 7 is a network diagram illustrating authentication and origin-based routing information sharing among DIAMETER nodes in an exemplary DIAMETER network for providing dynamic origination-based routing key registration according to an embodiment of the subject matter described herein.

FIG. 7 is a network diagram illustrating authentication and origin-based routing information sharing among DIAMETER nodes in an exemplary DIAMETER network for providing dynamic origination-based routing key registration according to an embodiment of the subject matter described herein. Referring to FIG. 7, DIAMETER server 100 may send message 102 including origin-based routing information indicating that all traffic received by DSR 104 in hub provider network 306 for appX from realm y 302 and realm Z 304 should be sent to DIAMETER server 100 in realm X 300. However, in the embodiment shown, rather than simply taking DIAMETER server 100's word for it, DSR 104 may authenticate the origin-based routing information provided in message 102 before generating any routing rules or routing traffic based on the routing rules. For example, reception of message 102 may trigger DSR 104 to generate and send an authentication message 700 to authentication server 702. If the origin-based routing information provided in the authentication request is authenticated, authentication server 702 may return an authentication response 704 to DSR 104 indicating that the origin-based routing information is authenticated. DSR 104 may then generate routing rules based on the origin-based routing information and route traffic accordingly.

Additionally, the embodiment shown in FIG. 7 illustrates an exemplary method for sharing origin-based routing information among DIAMETER nodes in the same network. For example, upon receiving message 102. DSR 104 may forward the received origin-based routing information to DSR 308 via origin-based routing information update notification message 706A and to DSR 312 via origin-based routing information update notification message 706B.

Figure 8:
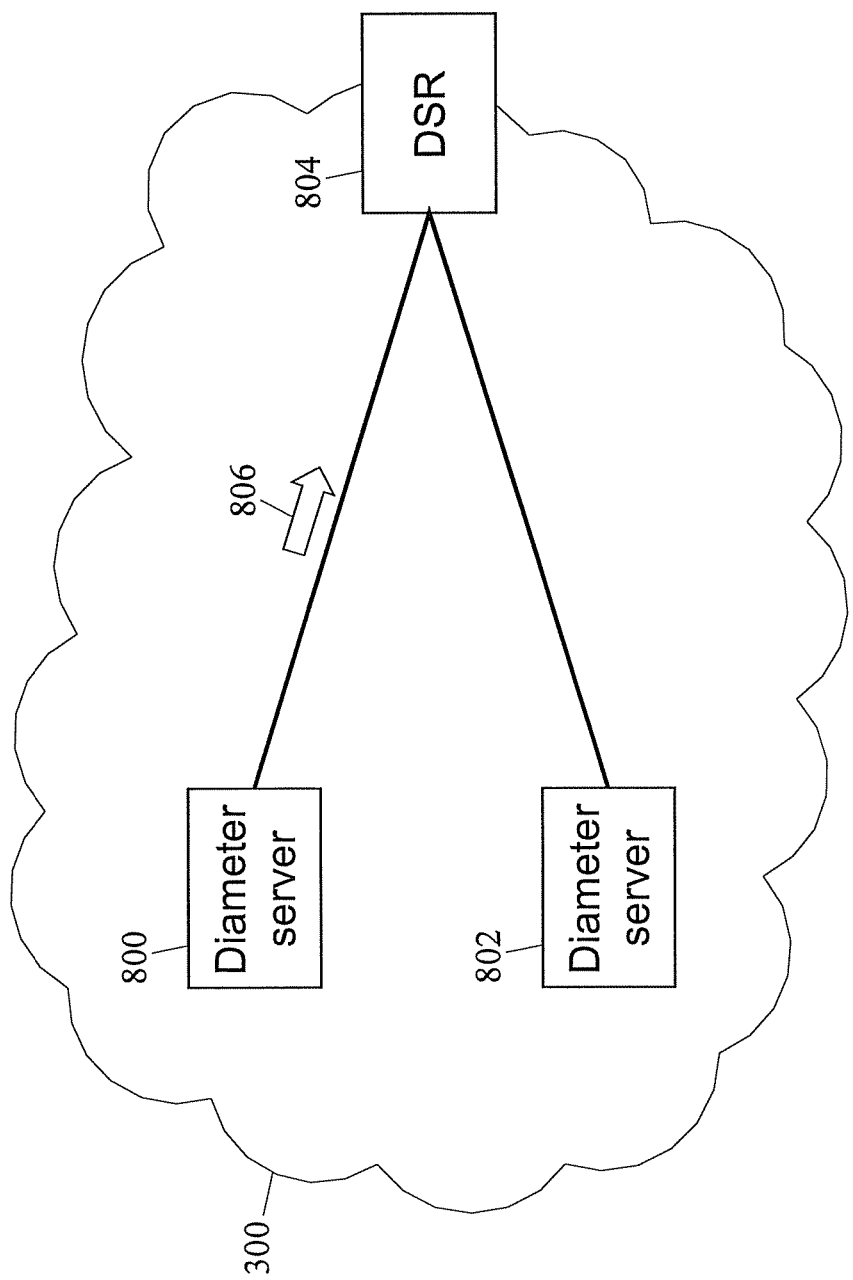
FIG. 8 is a network diagram illustrating an exemplary DIAMETER network where DIAMETER nodes a located within the same realm for providing dynamic origination-based routing key registration according to an embodiment of the subject matter described herein.

FIG. 8 is a network diagram illustrating an exemplary DIAMETER network where DIAMETER nodes are located within the same realm for providing dynamic origination-based routing key registration according to an embodiment of the subject matter described herein. Referring to FIG. 8, DIAMETER server 800 may wish for traffic that meets certain criteria to be routed to DIAMETER server 802. DIAMETER server 800 may inform DSR 804 within the same realm of the origin-based routing information via one (or more) messages. For example, DIAMETER server 800 may send message 806 to DSR 804, which includes origin-based routing information that specifies one or more sources, such that traffic originating from one of the one or more sources should be routed to a second DIAMETER node. Message 806 may include origin-based routing information. Message 806 may identify DIAMETER server 800 by an origin host identifier and, in this particular embodiment, may optionally leave off an origin realm identifier because DIAMETER servers 800 and 802 and DSR 804 each belong to the same realm (e.g., Realm=tklc.com). Additionally, message 806 may optionally include information identifying an application identifier specifying an application type such that traffic originating from an application of the specified application type should be routed to DIAMETER server 800. Finally, message 806 may include an origin-based routing key for indicating, to DSR 804, the identities of the hosts from which traffic originating at those hosts should be routed to DIAMETER server 800. For example, message 806 may include origin-based routing key=host_ID_Y, HOST_ID_Z (hosts Y and Z not shown).

In response to receiving message 806. DSR 804 may automatically generate one or more routing rules based on the origin-based routing information received in message 806. DSR 804 may then populate or update routing rules with the newly generated rule(s) and route traffic using routing rules.

FIG. 9 is an exemplary peer routing table illustrating exemplary routing rules that may be generated based on origin-based routing information for providing dynamic origination-based routing key registration according to an embodiment of the subject matter described herein. Referring to FIG. 9, an exemplary peer routing table (PRT) is shown. The PRT may be part of routing rules 106 which may be associated with DSR 104. Column 900 may include a destination realm identifier. The destination realm identifier may include either a specific realm (e.g., myNW.com) or may include a "don't care" condition. In a decision table such as the PRT shown in FIG. 9, a "don't care" condition is a logical condition in which the output is independent of the state of a set of given inputs. In other words, any realm will satisfy a don't care condition located in destination realm identifier column 900.

Column 902 specifies an application ID for identifying a particular application. For example, application ID=43 may be associated with HSS service and application ID=65 may be associated with MME service.

Column 904 specifies a destination host identifier for identifying a particular host. For example, a destination host identifier for Tekelec.net may include Dest-Host=Dserver@tklc.net.

Column 906 specifies an originating realm identifier for identifying a particular realm. For example, an originating realm identifier for Tekelec.com may include Origin-Realm=tklc.com.

Column 908 specifies an originating host identifier. For example, a destination host identifier for Tekelec.net may include Origin-Host=Oserver@tklc.net.

As discussed above, an originating realm ID and/or an originating host ID may comprise origin-based routing information for specifying one or more sources such that traffic originating from one of these sources should be routed to the second DIAMETER node. It is appreciated that conventional PRTs do not include the origin-based routing information shown in columns 906 or 908. As such, the inclusion of columns 906 and 908 is an important aspect of the subject matter described herein.

Column 910 specifies a routing action to be taken. Exemplary actions may include routing the message to the specified peer or returning an error message indicating that the message cannot be routed.

Column 912 specifies a route list name for identifying a route list. The route list may include one or more route names indicating the nodes over which messages should be routed. For example, route list names may include TKLC_NW, HSS1, MME2, or - - - for indicating route lists associated with Tekelec Northwest, Home Subscriber Server number 1, mobility management entity number 2, or an unnamed default route list, respectively. In one embodiment, route list name TKLC_NW may include route names TKLC_PEER1, TKLC_PEER2, TKLC_PEER3, and TKLC_PEER4, where TKLC_PEER1 and TKLC_PEER2 are an active route group and are associated with a high priority value (e.g., 1) while TKLC_PEER3. TKLC_PEER4 are a standby route group and are associated with a lower priority value (e.g., 2).

Column 914 specifies a priority for the rule. For given origin-based routing information, multiple routing rules may be generated. For example, a primary routing rule may specify that all traffic originating from host Z in realm Z should be routed to DIAMETER server 100. A secondary routing rule, having a lower priority, may specify that all traffic originating from realm Z should be routed to DIAMETER server 100. Finally, a default routing rule, having a lowest priority, may specify that all traffic originating from realm Z should be discarded and an error message returned to the sender.

Next, examples of how to apply the routing rules shown in FIG. 9 will now be described. Routing rule 916 illustrates that traffic originating from realmY.net and appX should be routed to TKLC_NW, regardless of its destination realm or destination host.

Routing rule 918 illustrates that traffic originating from realmZ.net and appX should be routed to TKLC_NW, regardless of its destination realm or destination host.

Routing rule 920 illustrates that traffic originating from host ID=21, application ID=43, and destination realm myNW.com should be routed to HSS1, regardless of its originating realm.

Routing rule 922 illustrates that traffic originating from application ID=65 and destination realm myNW.com should be routed to MME2, regardless of its originating realm or originating host.

Routing rule 924 illustrates a default rule specifying that traffic originating from realm orange.com should not be routed and an answer X should be sent, regardless of its originating host, application, destination realm, or destination host.

It is appreciated that in addition to assigning a priority to each routing rule in routing rules 106, route lists may be further differentiated by assigning a weight value to each rule and applying the combination of priority and weight values. The use of priority and weight values to differentiate between route entries (e.g., throttling traffic to an IP network server using alias hostname identifiers assigned to the IP network server with DNS) is more fully described in pending U.S. patent application Ser. No. 12/512,971, which is incorporated herein by reference in its entirety.

Figure 10:
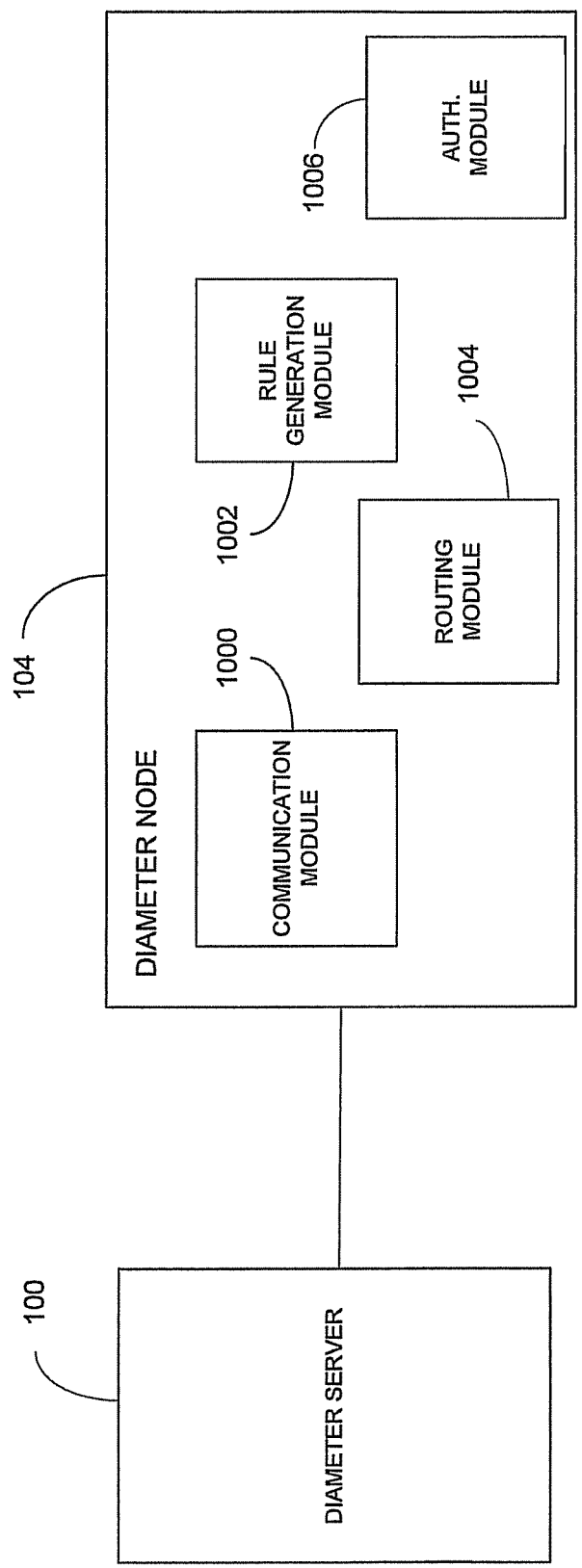
FIG. 10 is a block diagram illustrating an exemplary Diameter node for providing Dynamic origin based routing key registration according to an embodiment of the subject matter described herein.

FIG. 10 is a block diagram of a DIAMETER routing node that provides dynamic original based routing key registration in a DIAMETER network. In FIG. 10, Diameter node 104 includes a communications module 1000 for receiving, from a second DIAMETER node 100, origin-based routing information, wherein the origin-based routing information specifies one or more sources such that traffic originating from one of the one or more sources should be routed to the second DIAMETER node. Diameter node 104 further includes a rule generation module 1002 for automatically generating a routing rule based on the received origin-based routing information. Diameter node 104 may further include a routing module 1004 for routing traffic originating from the one or more sources to the second DIAMETER node 100 using the routing rule. Diameter node 104 may also include an authentication module 1006 for authenticating the received origin-based routing information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing dynamic origination-based routing key registration in a DIAMETER network, the method comprising:
   at a first DIAMETER node:
      receiving, from a second DIAMETER node, origin-based routing information, wherein the origin-based routing information specifies one or more sources such that traffic originating from one of the one or more sources should be routed to the second DIAMETER node;
      automatically generating an origin-based routing rule based on the received origin-based routing information, wherein the origin-based routing rule specifies that messages originating from the one or more sources should be routed to the second DIAMETER NODE; and
      routing DIAMETER messages received by the first DIAMETER node and originating from the one or more sources to the second DIAMETER node using the origin-based routing rule.

2. The method of claim 1 comprising automatically populating a routing table on the first DIAMETER node with the routing rule.

3. The method of claim 1 wherein the originating source information includes at least one of an originating realm identifier, an originating host identifier, and an application identifier.

4. The method of claim 1 wherein the origin-based routing information is included in dedicated message type.

5. The method of claim 1 wherein the origin-based routing information is included in one of a modified DIAMETER capabilities exchange request (CER) message and a modified DIAMETER capabilities exchange answer (CEA) message.

6. The method of claim 5 wherein the one of the modified DIAMETER CER message and the modified DIAMETER CEA message includes a routing key indicating the presence of origin-based routing information.

7. The method of claim 1 wherein the first DIAMETER node includes a DIAMETER signaling router.

8. The method of claim 1 wherein automatically generating a routing rule includes automatically generating a primary routing rule and a default routing rule.

9. The method of claim 8 comprising distinguishing the primary routing rule and the default routing rule using one of priority values and different weight values.

10. The method of claim 1 comprising authenticating the received origin-based routing information.

11. The method of claim 1 wherein the first DIAMETER node and the second DIAMETER node belong to the same realm.

12. The method of claim 1 wherein the first DIAMETER node belongs to a first realm and the second DIAMETER node belongs to a second realm.

13. A DIAMETER node for providing dynamic origination-based routing key registration in a diameter network, the system comprising:
a communications module embodied in a non-transitory computer readable medium and configured to receive, from a second DIAMETER node, origin-based routing information, wherein the origin-based routing information specifies one or more sources such that traffic originating from one of the one or more sources should be routed to the second DIAMETER node and
a rule generation module embodied in a non-transitory computer readable medium and configured to automatically generate an origin-based routing rule based on the received origin-based routing information automatically generating an origin-based routing rule based on the received origin-based routing information, wherein the origin-based routing rule specifies that messages originating from the one or more sources should be routed to the second DIAMETER NODE; and
a routing module embodied in a non-transitory computer readable medium and configured to route DIAMETER messages received by the DIAMETER node and originating from the one or more sources to the second DIAMETER node using the origin-based routing rule.

14. The DIAMETER node of claim 13 comprising a peer routing table populated with the routing rule.

15. The DIAMETER node of claim 13 wherein the communications module receives originating source information including at least one of an originating realm identifier, an originating host identifier, and an application identifier.

16. The Diameter node of claim 13 wherein the origin-based routing information is included in dedicated message type.

17. The Diameter node of claim 13 wherein the communications module receives origin-based routing information included in one of a modified DIAMETER capabilities exchange request (CER) message and a modified DIAMETER capabilities exchange answer (CEA) message.

18. The DIAMETER node of claim 17 wherein the one of the modified DIAMETER CER message and the modified DIAMETER CEA message includes a routing key indicating the presence of origin-based routing information.

19. The DIAMETER NODE of claim 13 wherein the DIAMETER node includes a DIAMETER signaling router.

20. The DIAMETER node of claim 13 wherein the routing rule generation module automatically generates a primary routing rule and a default routing rule.

21. The DIAMETER node of claim 13 wherein the routing rule generation module assigns one of a priority value and a weight value to the routing rule.

22. The DIAMETER node of claim 13 comprising an authentication module for authenticating the received origin-based routing information.

23. The DIAMETER node of claim 13 wherein the DIAMETER node and the second DIAMETER node belong to the same realm.

24. The DIAMETER node of claim 13 wherein the DIAMETER node belongs to a first realm and the second DIAMETER node belongs to a second realm.

25. A computer readable medium comprising computer executable instructions embodied in a non-transitory computer readable medium and when executed by a processor of a computer performs steps comprising:
at a first DIAMETER node:
receiving, from a second DIAMETER node, origin-based routing information, wherein the origin-based routing information specifies one or more sources such that traffic originating from one of the one or more sources should be routed to the second DIAMETER node; and
automatically generating an origin-based routing rule based on the received origin-based routing information, wherein the origin-based routing rule specifies that messages originating from the one or more sources should be routed to the second DIAMETER NODE; and
routing DIAMETER messages received by the first DIAMETER node and originating from the one or more sources to the second DIAMETER node using the origin-based routing rule.

* * * * *